US00RE48440E

(19) United States
(12) Reissued Patent
Burke et al.

(10) Patent Number: US RE48,440 E
(45) Date of Reissued Patent: Feb. 16, 2021

(54) USB CABLE AND METHOD OF PRODUCING SAME

(71) Applicant: Astronics CSC Corporation, Waukegan, IL (US)

(72) Inventors: Paul C. Burke, Waukegan, IL (US); James L. DuBois, Lockport, IL (US)

(73) Assignee: Astronics Connectivity Systems & Certification Co, Waukegan, IL (US)

(21) Appl. No.: 14/617,260

(22) Filed: Feb. 9, 2015

Related U.S. Patent Documents

Reissue of:
(64) Patent No.: 8,435,069
Issued: May 7, 2013
Appl. No.: 13/323,361
Filed: Dec. 12, 2011

U.S. Applications:
(63) Continuation of application No. 13/323,361, filed on Dec. 12, 2011, now Pat. No. 8,435,069, which is a continuation of application No. 12/798,320, filed on Apr. 1, 2010, now Pat. No. 8,075,335.

(60) Provisional application No. 61/166,248, filed on Apr. 3, 2009.

(51) Int. Cl.
*H02G 11/02* (2006.01)

(52) U.S. Cl.
CPC ..... *H02G 11/02* (2013.01); *Y10T 29/49201* (2015.01)

(58) Field of Classification Search
CPC ..... H02G 11/02; Y10T 29/49201
USPC ..... 439/501; 242/378.1
See application file for complete search history.

(56) References Cited

U.S. PATENT DOCUMENTS 5,094,396 A * 3/1992 Burke ..... B65H 75/44 242/375
5,424,491 A * 6/1995 Walling ..... H01B 11/02 174/113 R
5,588,626 A * 12/1996 Yang ..... 242/378.1
6,019,304 A * 2/2000 Skowronski et al. ..... 242/373
6,056,591 A * 5/2000 Liao ..... 439/501
6,254,025 B1 * 7/2001 Liao ..... 242/378.1
6,305,632 B1 * 10/2001 Hwang ..... 242/378.1
6,337,444 B1 * 1/2002 Liao ..... 174/135
6,371,398 B1 * 4/2002 Liao ..... 242/378.1
6,372,988 B1 * 4/2002 Burke ..... B65H 75/38 174/117 F
6,374,970 B1 * 4/2002 Liao ..... 191/12.4
(Continued)

FOREIGN PATENT DOCUMENTS

CN 1592938 A 3/2005
CN 2010800161840 6/2015
(Continued)

OTHER PUBLICATIONS

Compaq et al., Universal Serial Bus Specification Revision 2.0, Apr. 27, 2000. pp. 85-125.*
(Continued)

*Primary Examiner* — Albert J Gagliardi
(74) *Attorney, Agent, or Firm* — Vitale, Vickrey, Niro & Gasey LLP

(57) ABSTRACT

A method and apparatus for producing a USB cable capable of being fed out of and returned to a cable reel is disclosed along with a cable reel that houses the cable and provides connectivity for the cable.

15 Claims, 3 Drawing Sheets

(56) References Cited

U.S. PATENT DOCUMENTS 6,378,797 B1 * 4/2002 Liao ..... 242/378.1
6,397,991 B1 * 6/2002 Chang ..... 191/12.4
6,401,892 B1 * 6/2002 Chang ..... 191/12.4
6,415,898 B1 * 7/2002 Liao ..... 191/12.4
6,416,005 B1 * 7/2002 Liao ..... 242/378.1
6,416,355 B1 * 7/2002 Liao ..... 439/501
6,439,490 B1 * 8/2002 Hwang ..... 242/378.1
6,446,898 B1 * 9/2002 Hwang ..... 242/378.1
6,461,191 B1 * 10/2002 Chung ..... 439/501
6,474,585 B2 * 11/2002 Liao ..... 242/378.1
6,644,582 B1 * 11/2003 Liao ..... 242/378.1
6,682,008 B2 * 1/2004 Yeh ..... 242/378.1
6,733,328 B2 * 5/2004 Lin ..... H02G 11/02 439/501
6,736,346 B1 * 5/2004 Park ..... 242/378.1
6,736,661 B2 * 5/2004 Homer ..... 439/344
6,815,611 B1 * 11/2004 Gareis ..... H01B 11/1025 174/113 R
6,834,820 B2 * 12/2004 Wei ..... 242/378
6,858,951 B2 * 2/2005 Liao ..... 290/1 C
6,866,219 B2 * 3/2005 Wei ..... 242/378.4
6,871,812 B1 * 3/2005 Chang ..... 242/378.1
7,086,512 B2 * 8/2006 Shack et al. ..... 191/12.4
7,108,216 B2 * 9/2006 Burke et al. ..... 242/378.1
7,201,342 B2 * 4/2007 Huang ..... 242/378.1
7,222,812 B2 * 5/2007 Chang et al. ..... 242/378.1
7,364,109 B2 * 4/2008 Kuo ..... 242/373
7,384,013 B2 * 6/2008 Yen ..... 242/378
7,389,955 B2 * 6/2008 Liao ..... 242/378.1
7,523,883 B2 * 4/2009 Cheng ..... 242/378
7,604,194 B2 * 10/2009 Chang ..... 242/378.1
7,607,603 B1 * 10/2009 Chang ..... 242/378.1
7,681,822 B2 * 3/2010 Tai ..... 242/378.1
7,681,823 B2 * 3/2010 Chang ..... 242/378.1
7,784,727 B1 * 8/2010 Liao ..... 242/378.1
7,909,281 B2 * 3/2011 Liao ..... 242/378.1
8,123,010 B2 * 2/2012 Skowronski ..... B65H 75/4423 191/12.2 R
2002/0040945 A1 * 4/2002 Stepancich et al. ..... 242/378.1
2002/0053622 A1 * 5/2002 Kagel ..... 242/379
2003/0042097 A1 * 3/2003 Lee ..... 191/12 R
2003/0207611 A1 11/2003 Lin et al.
2004/0094649 A1 * 5/2004 Park ..... 242/378.1
2004/0129820 A1 * 7/2004 Liao ..... 242/378.1
2004/0200920 A1 * 10/2004 Wei ..... 242/378.4
2005/0087361 A1 * 4/2005 Hayes ..... H01B 11/02 174/113 R
2005/0178871 A1 8/2005 Liao
2005/0194486 A1 * 9/2005 Huang ..... 242/378.4
2006/0011763 A1 * 1/2006 Kuo ..... 242/378.1
2006/0102766 A1 * 5/2006 Chang et al. ..... 242/378.1
2006/0124342 A1 * 6/2006 Clark ..... H01B 11/02 174/113 R
2006/0186248 A1 * 8/2006 Liao ..... 242/378
2006/0261203 A1 * 11/2006 Yang ..... 242/378.4
2007/0001046 A1 * 1/2007 Wu ..... 242/378.1
2007/0141873 A1 * 6/2007 Yang ..... H01B 7/0876 439/108
2007/0262185 A1 * 11/2007 Burke et al. ..... H01R 13/72 242/370
2007/0295850 A1 * 12/2007 Lin ..... 242/378.1
2008/0105449 A1 * 5/2008 Kenny ..... H01B 7/0233 174/34
2009/0101743 A1 * 4/2009 Chang ..... 242/385.2
2009/0166462 A1 * 7/2009 Chang ..... 242/375
2011/0079676 A1 * 4/2011 Skowronski ..... B65H 75/4423 242/400

FOREIGN PATENT DOCUMENTS

EP 1752903 A2 2/2007
JP 2000357421 A 9/2005
WO 2004/109884 A1 12/2004

OTHER PUBLICATIONS

Hewlett-Packard Company et al., Universal Serial Bus 3.0 Specification, Nov. 2008. Chapter 5, pp. 1-53.*
European Search Report dated Oct. 11, 2016.
PCT Search Report/Opinion, dated Dec. 6, 2010.
AU Patent Application Report No. 1 for AU2015202376—dated Mar. 15, 2016.

* cited by examiner

USB CABLE AND METHOD OF PRODUCING SAME

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

The application claims priority of provisional application 61/166,248 filed on Apr. 3, 2009. The present invention relates generally to a USB cord, and more specifically to a USB cord coupled to a retractable reel.

FIELD OF THE INVENTION

Background of the Invention

Universal Serial Bus, or "USB" is a commonly used term that refers to a standard for connecting two electronic devices or for connecting a device and a host computer. Using USB technology, a plurality of peripherals can be connected using a single standardized interface socket. Plug-and-play capabilities may also be improved by permitting hot swapping—that is, by permitting devices to be connected and disconnected without rebooting the computer or turning off the device. Other features of USB technology include providing power to low-consumption devices, eliminating the need for an external power supply, and allowing many devices to be used without requiring manufacturer-specific device drivers to be installed.

In certain scenarios, it may be desirable to have a USB cord on a retractable reel, such that the cord can be extended and retracted into a reel depending on how and when it is being used.

SUMMARY OF THE INVENTION

The present invention relates to one or more of the following features, elements or combinations thereof.

In one embodiment, a retractable USB reel includes a pair of data wires placed next to each other and overlaid with an EMI/RFI shield. The data wires may be twisted around each other. Conductors can also be placed and twisted around the data wires or put in parallel relationship with the data wires. The resulting conglomerate of wires and shields can then be covered with a low friction substance and then an EMI/RFI shield.

In another embodiment, a cord reel is provided with an electrically conductive material. The cord reel is configured to carry a stationary USB coil and a movable USB coil, such that the two USB coils are in communication with each other.

DETAILED DESCRIPTION OF EMBODIMENTS OF THE INVENTION

Figure 1:
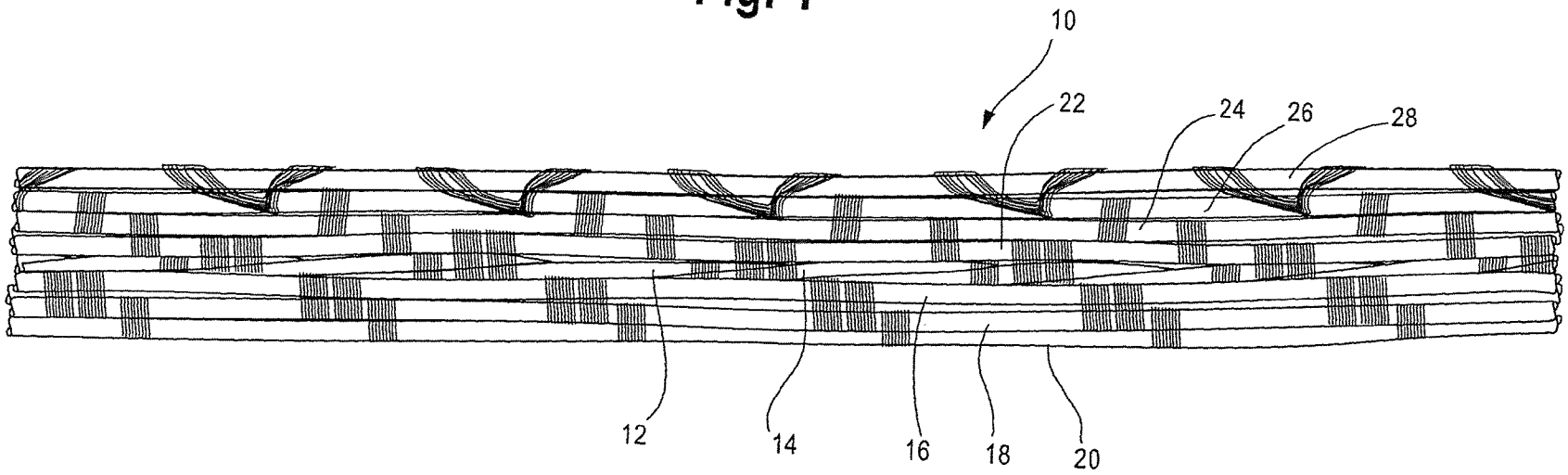
FIG. 1 is a top view of a flat USB connecting cable according to one embodiment of the invention.

As can be seen in FIG. 1, a flat USB cable 10 can include a first data wire 12 and a second data wire 14. First and second data wires 12, 14 are illustratively positioned adjacent to each other and twisted around each other. Other wires 16, 18, 20, 22, 24, 26, and 28 may also be positioned alongside first and second data wires 12, 14. In the illustrated example, other wires 16, 18, 20, 22, 24, 26 and 28 are arranged in a substantially parallel single row on either or both sides of first and second data wires 12, 14. The various wires 12, 14, 16, 18, 20, 22, 24, 26, and 28 are held together with a threaded material.

The present invention comprises a cable management system for organizing and managing a USB cable, and may optionally comprise other cables and/or wires coupled therewith. Such a management system facilitates the use and storage of a USB cord in a variety of environments, including passenger vehicles.

Figures 2, 3:
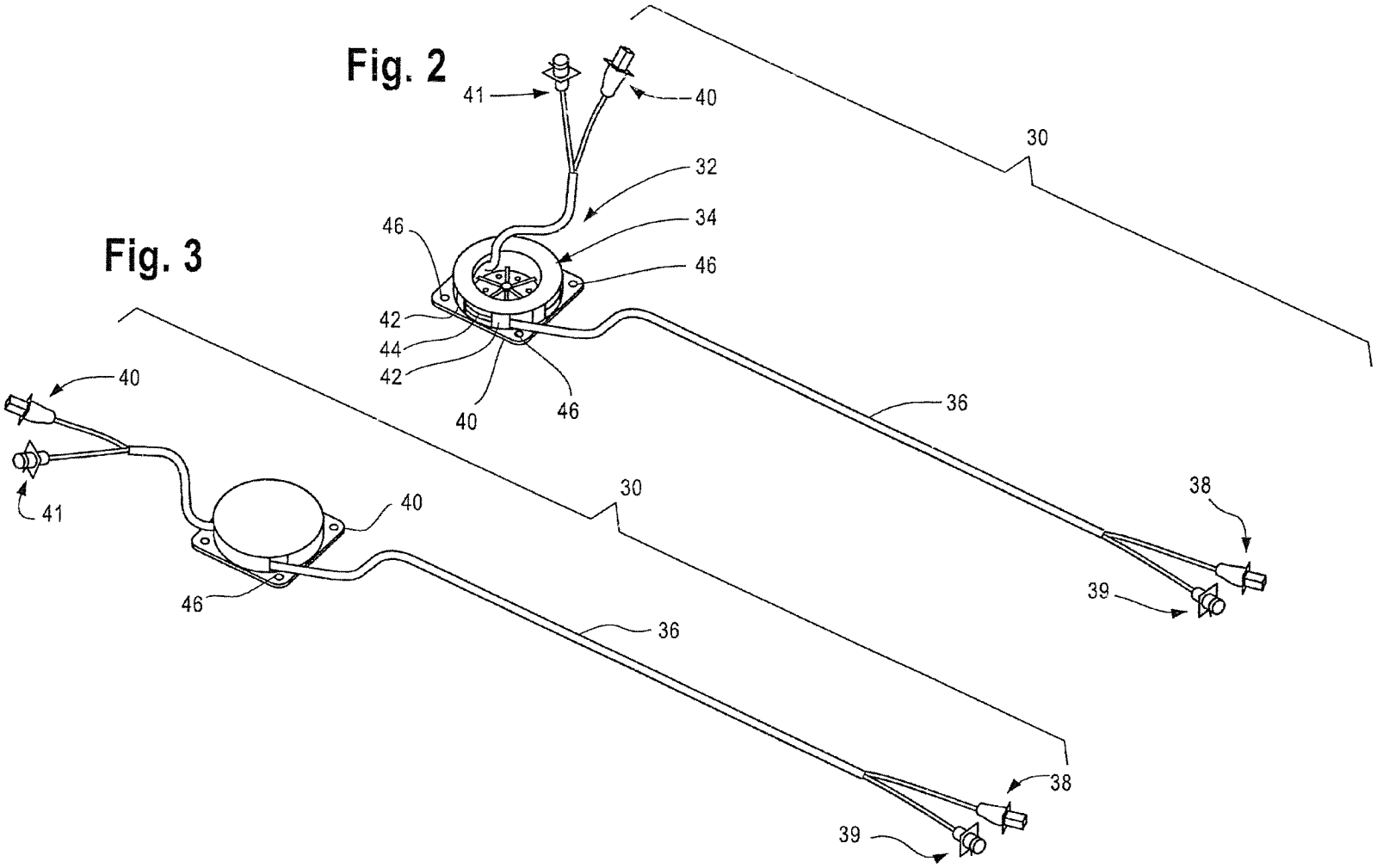
FIG. 2 is a perspective view of a USB cord reel according to one embodiment of the invention, the USB cord reel showing the inner elements of the cord reel.
FIG. 3 is a perspective view of a USB cord reel.

As can be seen in FIG. 2, the illustrative cable management system 30 comprises a cable storage unit 32, a cable reel 34, a cable 36, and a USB connector 38. A second USB connector or other electronic connector 40 may also be provided at the other end of cable management system 30. Additional connectors 39, 41 may also be provided. The cable storage unit 32 may have a tension element disposed within and coupled to reel 34, the tension element functioning to resist extraction of the cable 36 from the housing.

The cable storage unit 32 may be configured for mounting on a seat, a vehicle, or any other type of structure. Similar disclosures of cable storage units and cable management systems can be found in U.S. Pat. No. 5,094,396 to Burke, the subject matter of which is hereby incorporated by reference, and U.S. Patent Application No. 2007/0262185 to Burke, the subject matter of which is also hereby incorporated by reference.

In the embodiment shown in FIGS. 2-3, cable storage unit 32 includes a spool or reel 34 upon which a portion of the length of the cable 36 is wound. The cable storage unit 32 also includes a base or housing 40. The housing 40 may include a plurality of circumferentially spaced tabs 42 configured to enable reel 34 to be rotatable relative to housing 40. Additionally, tabs 42 may be configured to retain the wound portion 44 of the cable against reel 34. The inside surface of housing 40 may also be coated with an electrically conductive coating.

Housing 40 may also provide mounting holes 46 to facilitate mounting of the cable storage unit 32 underneath a passenger seat or in some other location. It should be understood that cable 36 may include multiple types of wires and/or connectors. For example, in the embodiments shown in FIGS. 2-3, two connectors 38, 39 and 40, 41 appear at each end of the cable management system 30.

Figure 4:
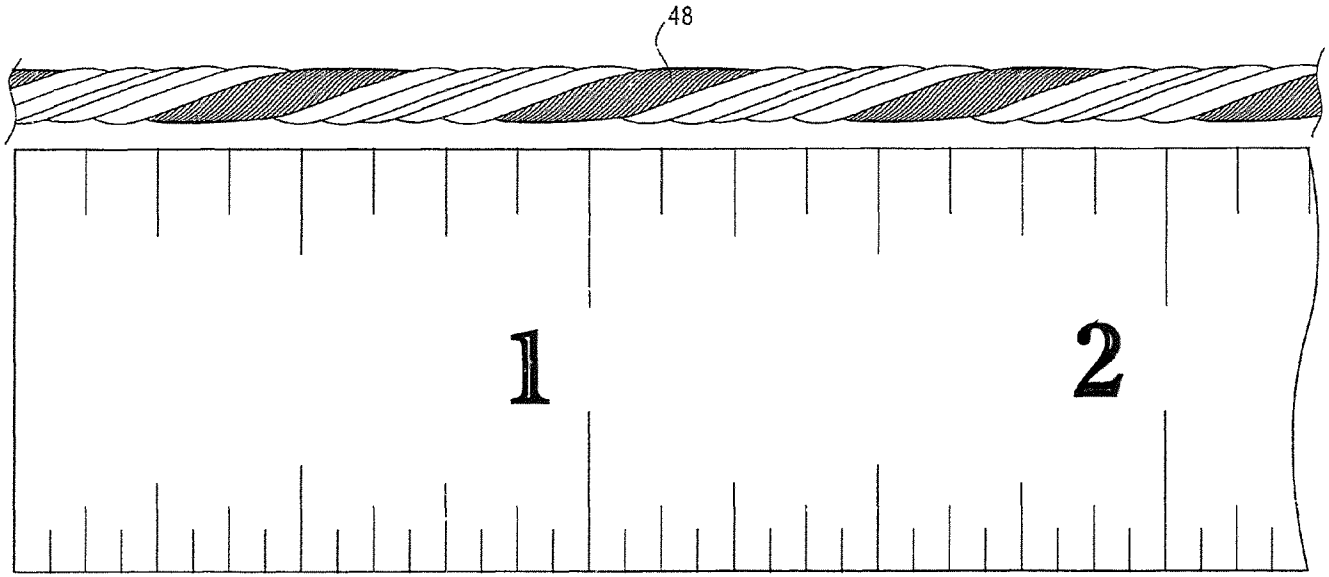
FIG. 4 is a perspective view of one embodiment of the invention without a jacket.

The manufacture and construction of cable 36 is illustratively as follows and can be seen in FIG. 4. A pair of USB data wires is placed next to each other in such a way as to remain substantially immobile relative to each other. For example, it is contemplated that the USB data wires are twisted around each other at a rate of approximately four twists per inch. The USB data wires can then be overlaid with a braided shield 48. Shield 48 functions to substantially remove void spaces between the data wires and may further assist in protecting the USB data wires from interference from any adjoining wires and appliances. In one embodiment, the shield is a helically braided, served shield. Collectively, the USB data wires and the shield are referred to herein as a "first construe."

Additional conductors/data wires are placed in close spatial relationship to the first construct to create a second construct having a cross section defining a substantially circular periphery. The additional conductors may be twisted or fluted helically about the first construct at a lay rate of two twists per inch. Alternatively, the additional conductors may be positioned alongside and parallel to the first construct, without twisting around the first construct. If desirable, "core fillers" may also be used to create a cord that is substantially round in construction. This "second construct" will ideally be formed to have a bend radius of 55 mm or greater.

The second construct is then covered with a low friction substance such as PFE, followed by second shield, such as an EMI/RFI shield. This process can ideally produce a USB cable with a bend radius of 55 mm or greater, a length of at least five meters, and a signal rate of at least 1.5 Mb.

It is also of interest to provide a USB cord that has sufficient impedance for the operation of electronic devices and data components. A suggested nominal impedance for most data to applications is 90 Ohms. Accordingly, one of the goals of the disclosed embodiment is to manufacture a USB cord that allows for approximately the illustrative 90 Ohms impedance.

It is observed that impedance is affected by physical and geometric properties of the wires and the constructs. The spacing between the wires, as well as the wall thickness of the wire insulation is significant. Bending the wires also affects impedance. Accordingly, it is significant to hold the USB data wires in a substantially uniform manner regardless of how the USB cord is positioned or bent.

Additional conductors/wires that are positioned along the USB wires can also affect impedance. Therefore, the position of such additional conductors and the shield between the conductors and the USB wires are considerations when constructing the USB cord. An additional shield around the non-USB conductors may also be desirable. Finally, a braided nylon jacket may be formed on top of entire bundle. This nylon jacket may affect impedance by putting pressure on the underlying data wires. Furthermore, in a "double served shield" embodiment, impedance may also be affected.

The following chart shows various impedances and the resulting decline in impedances in selected "P3" embodiments. The term "no jacket" means no nylon jacket was used. The term "jacket" refers to a nylon-braided jacket. Single serve and double serve refer to the number of shields around the constructs inside the cord.

| | No Jacket | | w/Jacket | 90Ω diff. |
|---|---|---|---|---|
| P3 Core Shield | 96Ω → | | 88.4Ω → | 1.6Ω |
| | ↓ | 7.6Ω | | |
| P3 Core Shield + | 3.3Ω | | | |
| Single Serv | 92.7Ω → | | 87.6Ω → | 2.4Ω |
| | ↓ | 5.1Ω | | |
| P3 core Shield + | 8.1Ω | | | |
| Double Serv | 84.6Ω → | | 82Ω → | 8Ω |
| | | 2.6Ω | | |

From the data shown above, it can be seen that a data wire with higher impedance must be used in order to result in a 90 Ohm impedance. Additional notes relating to the construction of the USB cord can be found in Exhibit A, attached hereto and incorporated by reference.

While the disclosure is susceptible to various modifications and alternative forms, specific exemplary embodiments thereof have been shown by way of example in the drawings and have herein been described in detail. It should be understood, however, that there is not intent to limit the disclosure to the particular embodiments disclosed, but on the contrary, the intention is to cover all modifications, equivalents, and alternatives falling within the spirit and scope of the disclosure.

We claim:

1. A universal serial bus cord reel apparatus, *the apparatus* comprising:

[A] *a* cable, the cable comprising a) first and second data wires adjacent to each other, and twisted around each other at approximately four twists per inch; b) a first braided shield surrounding the first and second data wires to prevent electromagnetic or radio frequency interference; c) two or more additional conductors adjacent to the shield surrounding the first and second data wires, the additional wires being twisted about the shield at approximately two twists per inch; d) an electrical insulator cover enclosing the additional conductors and first and second data wires; and e) a second shield enclosing the electrical insulator cover; whereby the cable has an impedance of approximately 90 ohms;

a universal serial bus connector at each end of the cable;

a housing;

a reel attached to and rotatable with respect to the housing for accepting the cable;

*a spring mounted between the housing and the reel for biasing the rotation of the reel in one direction for retracting the cable;* a ratchet attached to the housing [for selectively restraining rotation of the reel] whereby the cable *assembly* may be maintained [in an extended position], or retracted and wound on the reel.

2. A universal serial bus cord reel apparatus comprising:

[A] *a* cable, the cable comprising *a substantially round profile comprising:* a) first and second data wires adjacent to each other, and twisted around each other at approximately four twists per inch *and enclosed by a first shield*; b) two or more additional conductors adjacent to the *first* shield surrounding the first and second data wires, the additional wires being twisted about the shield at approximately two twists per inch; c) an electrical insulator cover enclosing the additional conductors and first and second data wires; and d) a second shield enclosing the electrical insulator cover; whereby the cable has an impedance of approximately 90 ohms;

a universal serial bus connector at each end of the cable;

a housing;

a reel attached to and rotatable with respect to the housing for accepting the cable;

a ratchet attached to the housing [for selectively restraining rotation of the reel] whereby the cable *assembly* may be maintained [in an extended position,] or retracted and wound on the reel.

*3. A cord reel apparatus for detachably supplying at least data to an electronic device, the apparatus comprising:*

*a cable assembly, the cable comprising a substantially round profile comprising:*

*a) first and second data wires adjacent to each other, and twisted around each other at a lay of multiple twists per inch;*

*b) two or more additional conductors adjacent the first and second data wires,*

*c) an electrical shield enclosing the additional conductors and first and second data wires; wherein the electrical shield reduces electromagnetic interference to the first and second data wires;*

*a connector at each end of the cable assembly;*

*a housing; and*

*a retractable reel attached to and rotatable with respect to the housing for accepting the cable assembly.*

*4. The cord reel apparatus of claim 3, wherein the additional conductors are twisted about the first and second data wires.*

*5. The cord reel apparatus of claim 3, wherein the cable assembly has a nominal impedance sufficient for the operation of electronic devices and data components.*

*6. The cord reel apparatus of claim 5, wherein the cable assembly has a nominal impedance of approximately 90 ohms.*

*7. The cord reel apparatus of claim 3, wherein the connector is a Universal Serial Bus connector.*

*8. The cord reel apparatus of claim 3, wherein the retractable reel is a self-retracting reel.*

*9. The cord reel apparatus of claim 3, further comprising a locking mechanism for selectively restraining rotation of the reel whereby the cable may be maintained in an extended position, or retracted and rewound on the retractable reel.*

*10. The cord reel apparatus of claim 3, wherein the first and second data wires are twisted around each other at a lay of approximately four twists per inch.*

*11. A universal serial bus cord reel apparatus for detachably supplying at least data to an electronic device, the apparatus comprising:*

*a cable assembly, the cable comprising a substantially round profile comprising:*

*a) first and second data wires adjacent to each other, and twisted around each other at approximately four twists per inch;*

*b) a first shield surrounding the first and second data wires to prevent electromagnetic or radio frequency interference;*

*c) two or more additional conductors adjacent to the first and second data wires,*

*d) a second shield enclosing the additional conductors and first and second data wires; and*

*e) a third shield enclosing the second shield; wherein the second and third shields reduce electromagnetic interference to the first and second data wires;*

*a universal serial bus connector at each end of the cable assembly;*

*a housing;*

*a reel attached to and rotatable with respect to the housing for accepting the cable assembly;*

*a ratchet attached to the housing whereby the cable assembly may be maintained, or retracted and wound on the reel.*

*12. The cable assembly of claim 11, wherein the additional conductors and the twisted first and second data wires are twisted about one another.*

*13. A cord reel apparatus for detachably supplying at least data to an electronic device, the apparatus comprising:*

*a cable assembly, the cable assembly having a substantially round profile comprising:*

*a) first and second data wires adjacent to each other, and twisted around each other at approximately four twists per inch;*

*b) two or more additional conductors twisted around the first and second data wires;*

*c) a shield enclosing the additional conductors and first and second data wires;*

*whereby the first and second data wires of the cable assembly have an impedance of approximately 90 ohms;*

*a connector at each end of the cable assembly;*

*a housing; and*

*a retractable reel attached to and rotatable with respect to the housing for accepting the cable assembly.*

*14. The cable assembly of claim 13, further comprising a first braided shield surrounding the first and second data wires to prevent electromagnetic or radio frequency interference.*

*15. The cable assembly of claim 13, wherein at least one connector of the connector at each end of the cable assembly is a USB connector.*

* * * * *